Dec. 27, 1955 E. BARANY ET AL 2,728,577

MAGNETIC INSTRUMENT MECHANISM HEAD

Filed Nov. 9, 1950 4 Sheets-Sheet 1

*INVENTORS*
Edmund Barany
Harold W. Bauman
Melvin Sackter

*BY*

ATTORNEYS

Edmund Barany
Harold W. Bauman
Melvin SacKter
INVENTORS

BY [signatures]

ATTORNEYS

Edmund Barany
Harold W. Bauman
Melvin Sackter
INVENTORS

BY

ATTORNEYS

Dec. 27, 1955 E. BARANY ET AL 2,728,577

MAGNETIC INSTRUMENT MECHANISM HEAD

Filed Nov. 9, 1950 4 Sheets-Sheet 4

Edmund Barany
Harold W. Bauman
Melvin Sackter
INVENTORS

BY Perry L. Fenster
James B. Boyer
ATTORNEYS

Patented Dec. 27, 1955

2,728,577

MAGNETIC INSTRUMENT MECHANISM HEAD

Edmund Barany and Harold W. Bauman, Chicago, and Melvin Sackter, Arlington Heights, Ill., assignors to Ampro Corporation, Chicago, Ill., a corporation of Illinois Application November 9, 1950, Serial No. 194,918

2 Claims. (Cl. 274—4)

The present invention relates to magnetic recording and/or reproducing instruments and more particularly to arrangements of elements that cooperate with the various devices that such instruments include and that perform various functions relative to the elongate record bodies of magnetizable material that are used with such instruments.

An instrument of the kind in question includes a magnetic head, which may be used for either or both recording and reproducing, and which provides a surface for contacting and guiding a record body past the head in a path correctly located for interaction between the record body and a magnetic circuit element that forms a part of the head. The instrument also includes motor operated mechanism for advancing a record body, and the record body-driving device of such mechanism conveniently comprises a capstan roller against the surface of which the record body is pressed with sufficient force to cause it to travel with the surface of the roller. For recording, such an instrument includes also an erasing and record body conditioning device past which the record moves as it travels to the head, and the function of which is to demagnetize the body as completely as practical prior to its recording magnetization by the head. A simple and inexpensive erasing and conditioning device is provided by an assembly including a magnet and providing a record body-contacting surface for guiding the record body in a path correctly located with respect to the magnet for accomplishing the erasing and conditioning.

The record body-contacting surfaces of the erasing device, the magnetic head device and the capstan roller device all define a travel path for record bodies. Advantageously the travelling record body is maintained in contact with each of these path-defining surfaces by pressure elements located on the opposite side of the path respectively from the record body-contacting surfaces provided by the various devices and arranged to exert pressures on the body to press it against them. For threading a record body into the instrument or removing one from it, the pressure elements may all be movable between advanced positions wherein they are disposed to press a record body against the opposed device surfaces and retracted position wherein they are spaced from such surfaces to the opposite side of the path.

A magnetic instrument of the kind in question also is provided with a magnetic head shielding arrangement that includes a casing surrounding the head but provided with a window for magnetic interchange of energy between the magnetic head circuit and a record body travelling along the path. Preferably the shielding arrangement includes an auxiliary shield element that overlies the window on the opposite side of the record path from the head, and that is movable from an advanced position wherein a part of it extends across the path into contact with the head shielding casing and a retracted position spaced from the head shielding and record path to permit threading.

To avoid a multiplicity of individual operations for moving the various pressure elements and the auxiliary shield between their advanced and retracted positions, it is desirable to provide operating mechanism for all of these movable elements that is actuable by movement of a single actuator element. For assuring that such movable elements be in their advanced positions when a record body is travelling along the path for cooperation with the various instrument devices, it is advantageous to operate such an actuator from a switch controlling the motor that rotates the capstan roller. The arrangement of mechanism to provide these advantageous features presents certain problems, such as that of transfer of force for moving the elements from a single actuator to the elements that are spaced along the record travel path, provision for exertion of proper individual pressures by the respective pressure elements when they are in advance positions, and the translation of a predetermined movement of a switch operator into movements of directions and magnitudes suitable to move the various elements between their retracted and advanced positions.

A primary object of the invention is the provision of a novel system for moving between advanced operating positions and retracted positions, by a single actuating movement of an operator device, plural elements that respectively are cooperative with the various devices of a magnetic recording and/or reproducing instrument, and including both a pinch roll that cooperates with a record body-driving capstan roller and pressure-exerting elements that cooperate with other devices while stationary by exerting pressure against them.

Reference is made to the copending application for United States Patent of Harold W. Bauman, Serial No. 194,914, now Patent 2,682,410, filed November 9, 1950, disclosing and claiming a system of resilient strips for mounting individual pressure pads and an auxiliary magnetic head shield upon an actuator that is movable between two preselected, definite positions, one of which serves to maintain the pads and shield in pressure-exerting relation to the instrument devices with which they are cooperative. Reference also is made to application for United States Patent, Serial No. 194,915, now Patent 2,687,881, filed November 9, 1950, by Edmund Barany and Melvin Sackter, disclosing and claiming mechanism for supporting a pinch roll for operation by an actuating member, and for operating that member between two preselected positions from a motor switching shaft that is movable between two predetermined positions. The present invention is a novel combination of the inventions disclosed and claimed by the two applications in question.

Figures 1, 2:
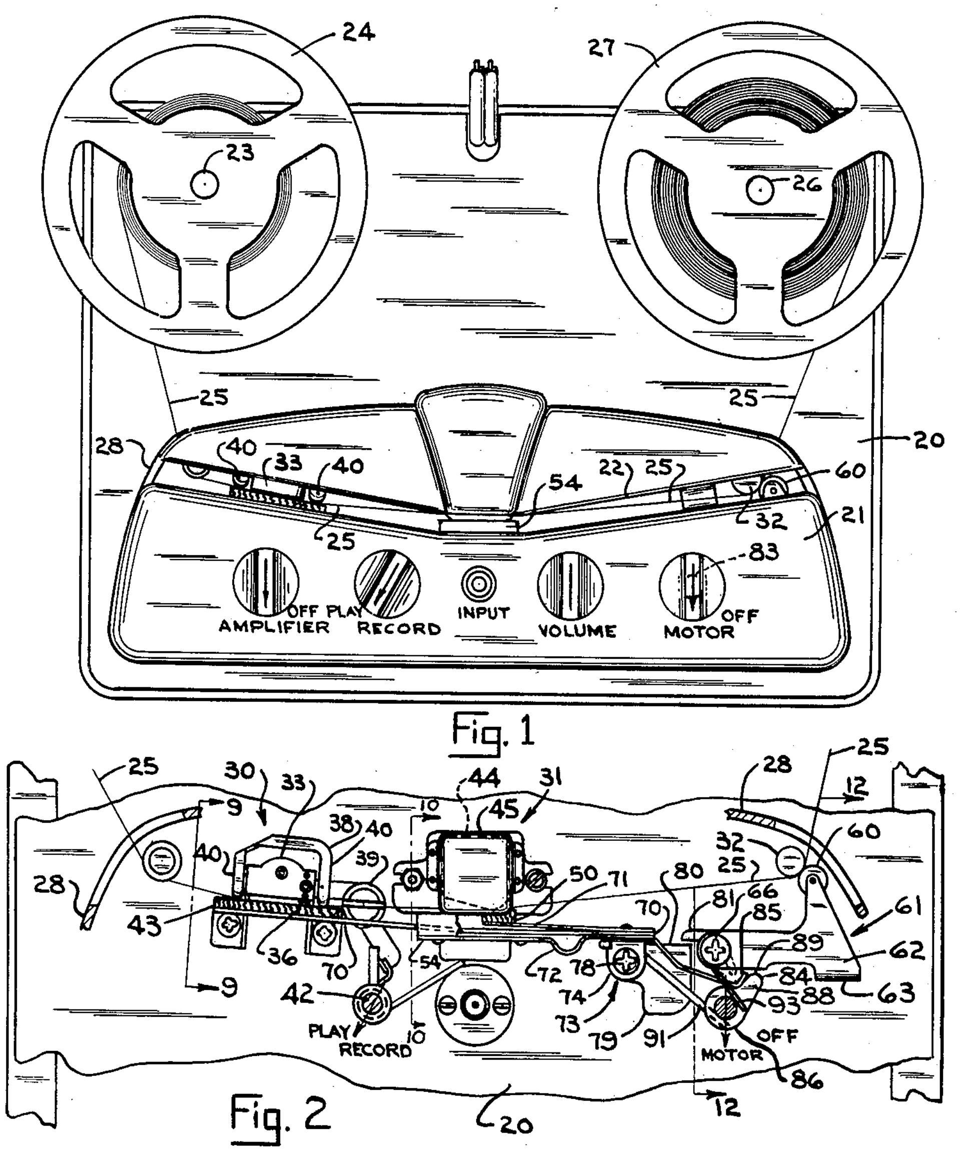
Fig. 1 is a top plan of a magnetic recording and reproducing instrument arranged in accordance with the invention.
Fig. 2 is an enlarged fragmentary top plan with the mechanism head housing broken away to show the mechanism that embodies the invention.
Figure 6:
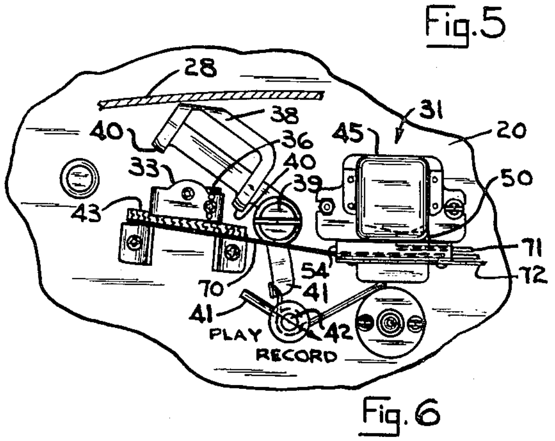
Fig. 6 is a fragmentary top plan showing a third condition of the mechanism.
Figure 7:
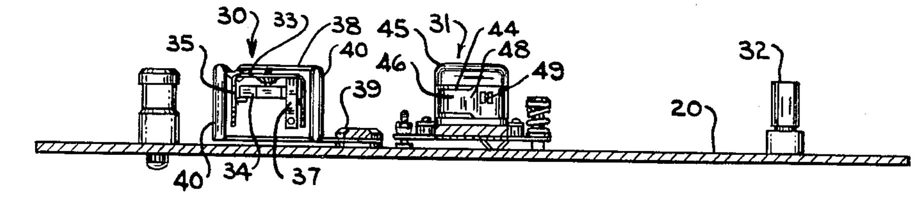
Fig. 7 is a vertical section on line 7—7 of Fig. 5.
Figure 8:
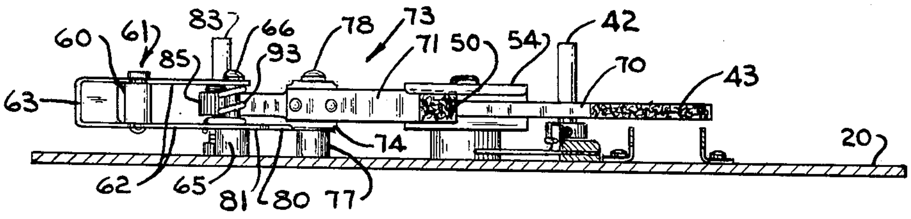
Fig. 8 is a vertical section on line 8—8 of Fig. 5.

The instrument shown in the drawings is designed for cooperation with record bodies of tape form. As seen in Fig. 1, the instrument comprises casing structure enclosing electronic apparatus and motor-actuated record-driving mechanism. The casing includes a cover plate 20 that also serves as a support for the devices and elements that make up the mechanism head of the instrument, and for a hood cover 21 that encloses such devices and elements. Hood 21 is provided with an elongate slot 22 that is of longitudinal form to substantially correspond with and to overlie the record body path defined by the instrument devices and elements, so that the instrument may be simply and readily threaded by dropping a record tape into slot 22. The instrument also is provided with a suitable spindle 23 for holding a supply reel 24 from which the record body 25 is withdrawn and fed to the mechanism head. Suitable mechanism is associated with a takeup reel spindle 26 for rotating a reel 27 supported on such spindle to wind up the record body as it emerges from the mechanism head. The hood 21 has a surrounding side wall 28 that is fragmentarily shown in Fig. 2 and Fig. 6, and that is suitably contoured at the ends of slot 22 to provide adequate clearance for the record body.

Referring to Figs. 2, 3, 5 and 7, the instrument includes in spaced relation along the record body travel path, and in successive order in the direction of record body travel from the supply to the takeup reel, an erasing and conditioning assembly 30, a magnetic head assembly 31, and a record body-driving capstan roller 32.

Figure 9:
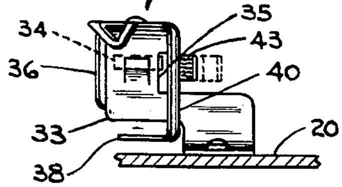
Fig. 9 is a transverse vertical section on line 9—9 of Fig. 2.
Figure 12:
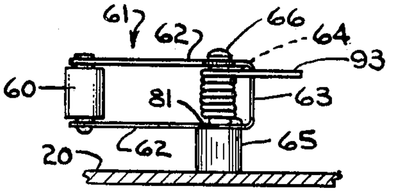
Fig. 12 is a transverse vertical section on line 12—12 of Fig. 2.
Figure 3:
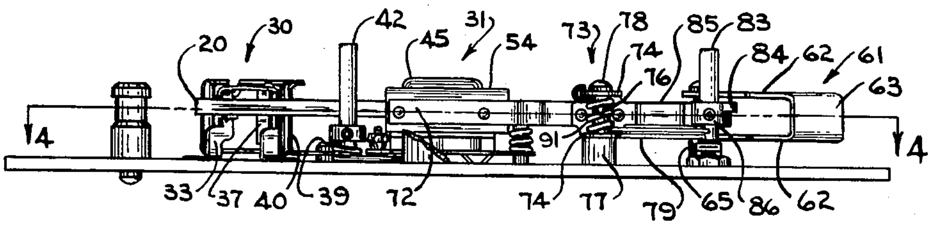
Fig. 3 is a front elevation of the head mechanism.

The erasing assembly shown, which is fully described and claimed in applications for United States patent, Serial No. 194,916, now Patent 2,617,890, filed November 9, 1950, and Serial No. 194,917, now Patent 2,688,053, filed November 9, 1950, comprises a mounting bracket 33 for supporting a magnet 34 in registration with, and with its polar surfaces facing the record body path. One side arm of bracket 33 provides at 35, Figs. 7 and 9, a surface adjacent the leading end of the magnet for contact with a record body travelling toward head assembly 31, and guiding such body sufficiently close to the leading one of the magnet pole surfaces to saturate the record body as it passes. An inwardly and outwardly adjustable member 36 provides a record body contacting surface 37 in front of the trailing pole surface of the magnet for guiding the record body through a region of field intensity to demagnetize as completely as practical a record body after having been magnetized to saturation adjacent the leading pole surface. To disable the erase assembly 30 during reproduction from a record body travelling past head 31, a structure 38 is associated with the magnet and bracket. This structure, fully disclosed and claimed in the above identified application Serial No. 194,916, now Patent 2,617,890, and which is pivoted to plate 20 to one side of bracket 33 by a screw 39, has a pair of members 40 provided with path-facing record body-contacting surfaces that are movable, from a retracted position shown in Fig. 6, across the record path to the position shown in Figs. 2 and 5. When in the latter position the members 40 serve to guide a record body past magnet 34 in a path lying outside the region of erasing effectiveness of the field of the magnet. Conveniently, and as disclosed and claimed by application Serial No. 194,916, now Patent 2,617,890, structure 38 is swung between its two positions by linkage 41 actuated by a rotatable shaft 42 that also operates switching means for converting the electronic apparatus of the instrument between recording and reproducing conditions.

To maintain a record body in contact with the erasing and conditioning record body-contacting surfaces 35, 37, or with the front surfaces of members 40, depending on the position of structure 38, a pressure pad 43 is supported, by means to be described later, to be resiliently urged toward pressure-exerting contact with such surfaces.

The magnetic head assembly 31 comprises a head element 44 that contains means providing a magnetic circuit having a gap that is located at the front of element 44 closely adjacent the record body path. Head element 44 is surrounded by a shielding casing including a can 45 that covers the top and sides of the element and that is provided at the side facing the record path with a window 46. Facing this window the head element 44 is provided with a surface 48 for contacting a record body and guiding it closely adjacent gap 49 (see Fig. 7).

To maintain a record body in contact with guide surface 48 of head element 44, a pressure pad 50 is supported, by means to be described, to be resiliently urged into pressure-exerting contact with surface 48.

Figure 10:
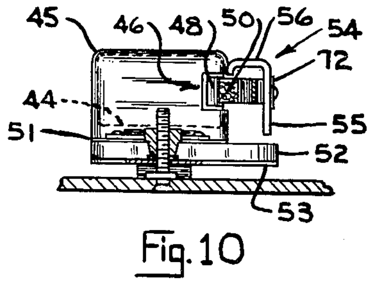
Fig. 10 is a transverse vertical section on line 10—10 of Fig. 2.
Figure 11:
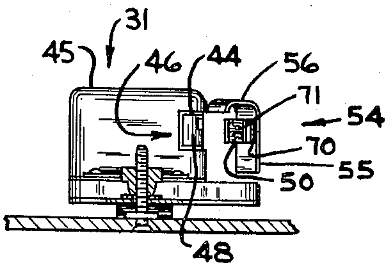
Fig. 11 is a transverse vertical section on line 11—11 of Fig. 5.

In addition to can 45, the shielding of head element 44 includes a bottom plate 51 secured to the lower edge of the can and extending under the head element. Spaced below bottom shield plate 51 by a pad 52 is a second shield plate 53 that projects under and across the record path, as shown in Fig. 10. To shield the window 46 from stray magnetic fields a shield element 54 is provided. This element which is fully disclosed and claimed in the application for United States Patent, Serial No. 194,823, filed November 9, 1950, has a plate-like part 55 arranged and disposed to overlie and mask window 46 on the opposite side of the record path from head assembly 31. A second part 56 is angularly related to part 55 to project over and across the record path into contact with the head shielding can 45 above window 46. By means to be described later the shield element 54 is supported and resiliently urged into a position wherein the second part 56 contacts and exerts pressure against shield can 45.

For cooperation with capstan roller 32, to press a record body against it for drive of the latter as the roller rotates, a pinch roll 60 is provided. This roll is supported for rotation about an axis parallel to that of the roller 32 by a carrier bracket structure 61 forming a part of the subject matter of the above-identified application, Serial No. 194,915, now Patent 2,687,881. Structure 61 comprises a pair of horizontal, parallel and generally L-shaped bracket arms 62, spaced apart by a connecting portion 63 (see Fig. 3). Pinch roll 60 is rotatably mounted between the end parts of corresponding reaches of the L-shaped arms 62. The bracket structure is pivotally mounted for swinging of roll 60 about an axis spaced from and parallel to the axes of roller 32 and roll 60, by a post 64 mounted in cover plate 20 and extended through aligned bearing openings in bracket arms 62. A spacer collar 65 positions the bracket for registration of roll 60 with the record path and capstan roller, and a cap screw 66 secures the bracket to the post.

The means for supporting and urging pressure pad elements 43, 50 and shield element 54 toward pressure-exerting contact with opposed surfaces of erasing assembly 30 and head assembly 31 is disclosed and claimed by the above-identified application Serial No. 194,914, now Patent 2,682,410, and comprises individual resilient strips 70, 71 and 72 respectively secured to the rear sides of the elements 43, 50 and 54. From the locations of these elements the strips 70, 71, 72 extend alongside the record path to a location spaced laterally from the path between bracket mounting post 65 and auxiliary shield element 54. At this location all of the the strips are secured to an actuating member, designated generally 73, that is movable between two definite and predetermined positions. These positions hereinafter are called the "advanced" and "retracted" positions of member 73, and respectively correspond to the advanced positions of elements 43, 50, 54 and 60 that have been described above, and retracted positions of the same elements wherein they are spaced to the opposite side of the record path from the contact surfaces of devices 30, 31 and 32 sufficient distances to permit ready threading of the instrument or release of a record body for unthreading. The resilient strips 70, 71, 72 have such longitudinal configurations and dispositions that when actuating member 73 is in its advanced position, contact by the elements supported by the respective strips with the opposed surfaces of the instrument devices deflects the strips so that they urge the elements against the opposed surfaces with proper pressures to maintain a record body against the latter. From Fig. 2 it will be seen that strip 72 that supports shield element 54 is most remote from the record path, strip 71 that supports pad 50 being closest to the path, and strip 70 extending between strips 71 and 72 and through shield element 54 to the rear of pressure pad 50.

In accordance with the present invention actuating member 73 comprises a U-shaped bracket, having a pair of parallel and horizontally disposed arms 74 spaced apart by a cross reach 75 (Fig. 4) that provides an outer flat surface to which the end portions of strips 71, 70, 72 are secured in successive stacked relation. Actuating member 73 is pivotally mounted to swing between its two positions about an axis that is spaced laterally of the record body path at a location between and spaced from both auxiliary shield element 54 and pinch roll 60. Mounting for the actuating member is shown as a pin 76 mounted in cover plate 20 and extended through aligned bearing holes in arms 74. A spacer collar 77 spaces the adjacent arm 74 from plate 20, and a cap screw 78 secures the bracket member to the pin.

In accordance with application Serial No. 194,915, now Patent 2,687,881, the lower flange or arm 74 of actuating member 73 has a formation providing an eccentric portion 79 that has an edge surface at 80 for contacting and swinging a nosepiece 81 that is extended from the lower bracket arms of the structure supporting pinch roll 60. As seen in Fig. 2, when actuating member 73 is swung counterclockwise its eccentric part 79 swings bracket structure 61 clockwise to move pinch roll 60 to its retracted position. Such counterclockwise swinging of actuating member 73 also swings pressure pads 43, 50 and auxiliary shield element 54 counterclockwise to their retracted positions.

Figures 4, 5:
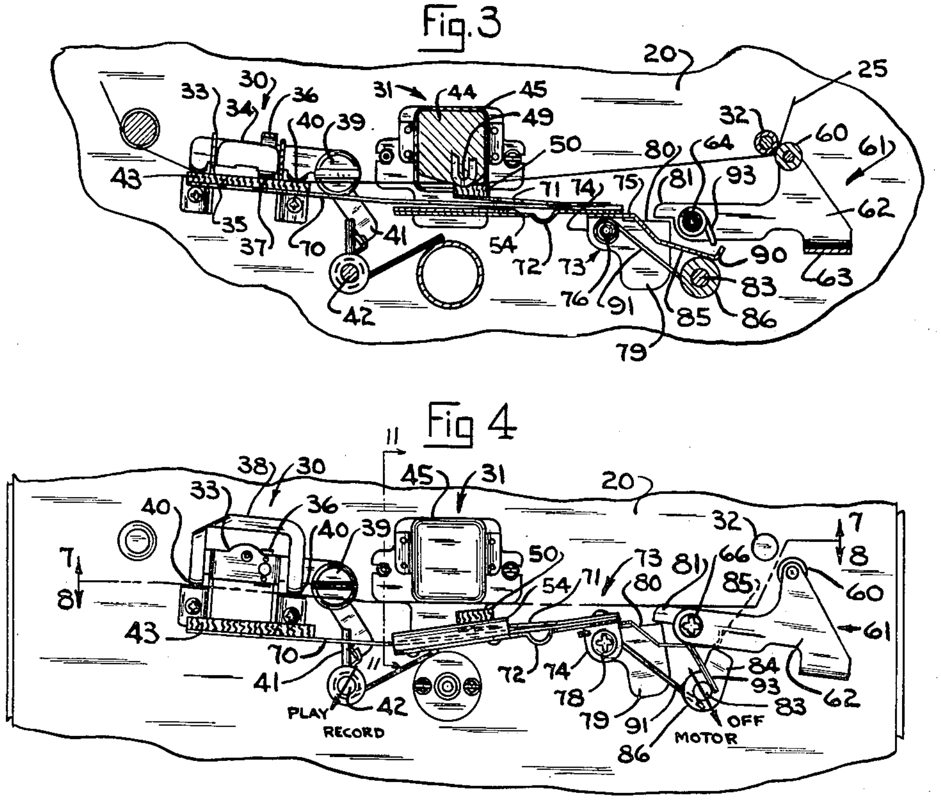
Fig. 4 is a horizontal section on line 4—4 of Fig. 3.
Fig. 5 is a top plan similar to Fig. 2, but showing a second condition of the mechanism.

The mechanism described above is provided with spring means that biases the various elements 43, 50, 54 and 60 to their advanced positions, and that also acts to urge them into pressure-exerting contact with the surfaces of the instrument devices 30, 31, 32 that oppose them. Additionally, and as suggested above, it is desirable to actuate the mechanism that moves the elements from an operator that controls a motor driving the capstan roller 32. Such an operator is movable through a definite path between predetermined positions respectively effective to maintain the motor stopped and in operation. In the arrangement shown the switch operator comprises a shaft 83 that is rotatable through a definite angle between "on" and "off" positions indicated by the arrows in Figs. 2 and 5. Shaft 83 carries an arm 84 that in movement of the shaft from its "on" to its "off" position is effective to swing an operating lever 85 that is secured to and projects from actuating member 73, to swing the latter to its retracted position. Lever 85 may be secured to the inner surface of the actuating member cross reach 75. Operating lever 85 and arm 84 are arranged to provide detent action indexing actuating member 73 in its advanced position when shaft 83 is in its "on" position, and cooperates with a bias spring to move the actuating member to that position when the switch shaft 83 is turned from its "off" position. To this end, arm 84 and a collar 86 that supports it on shaft 83, together provide a cam surface for swinging lever 85, such surface including a dwell portion 88 and a riser portion 89. The end portion of lever 85 is formed to provide a portion 90 acting as a cam follower. Biasing means urging actuating member 73 to its advancing position comprises a spring 91 having a coiled body portion surrounding pin 76 between arms 74 and end portions respectively hooked over an edge of the upper arm and bearing against switch shaft 83. Spring 91 urges actuating members 73 clockwise, as seen in Figs. 2 and 5, towards its advanced position, and causing follower portion 90 to maintain contact with the cam surface. Spring 91 also serves to index actuating member 73 in its advanced position, which corresponds to the "on" position of shaft 83, by entry of follower portion 90 into dwell 88. The retracted position of actuating member 73 is fixed by the longitudinal configuration of lever 85 and the spacing of the end surface of eccentric arm 84 from the axis of shaft 83, the angular disposition of the end surface of the arm being such that rotation of shaft 83 to its "off" position establishes a dead center relation between the arm and operating lever 85, as shown in Fig. 5. Counterclockwise swinging of arm 84 beyond this dead center relation to lever 85 and the shaft axis is prevented by the conventional switch arrangement that limits operating shaft rotation to its "off" position.

A bias spring 93 for carrier bracket structure 61 has a coiled body portion surrounding pin 64 between the bracket arms 62, and end portions respectively hooked over an edge of the lower arm 62 and bearing against shaft 83. This spring biases the carrier bracket to maintain pinch roll 60 in its advanced position, and while the roll is in such position spring 93 urges it against capstan roller 32 with proper pressure for drive of a tape record body by the roller. As shown in Fig. 2, it is desirable that there be a slight clearance between contact surface 80 of the eccentric portion of actuating member 73 and the nosepiece 81 of carrier bracket 61 when the member and bracket are in their advanced positions. When the actuating member 73 is swung from its advanced position of Fig. 2, counterclockwise as seen in that figure, surface 80 contacts nosepiece 81 and swings bracket 61 to its retracted position. The clearance mentioned above prevents blocking by the actuating member of bracket 61 from its completely advanced position.

Figure 13:
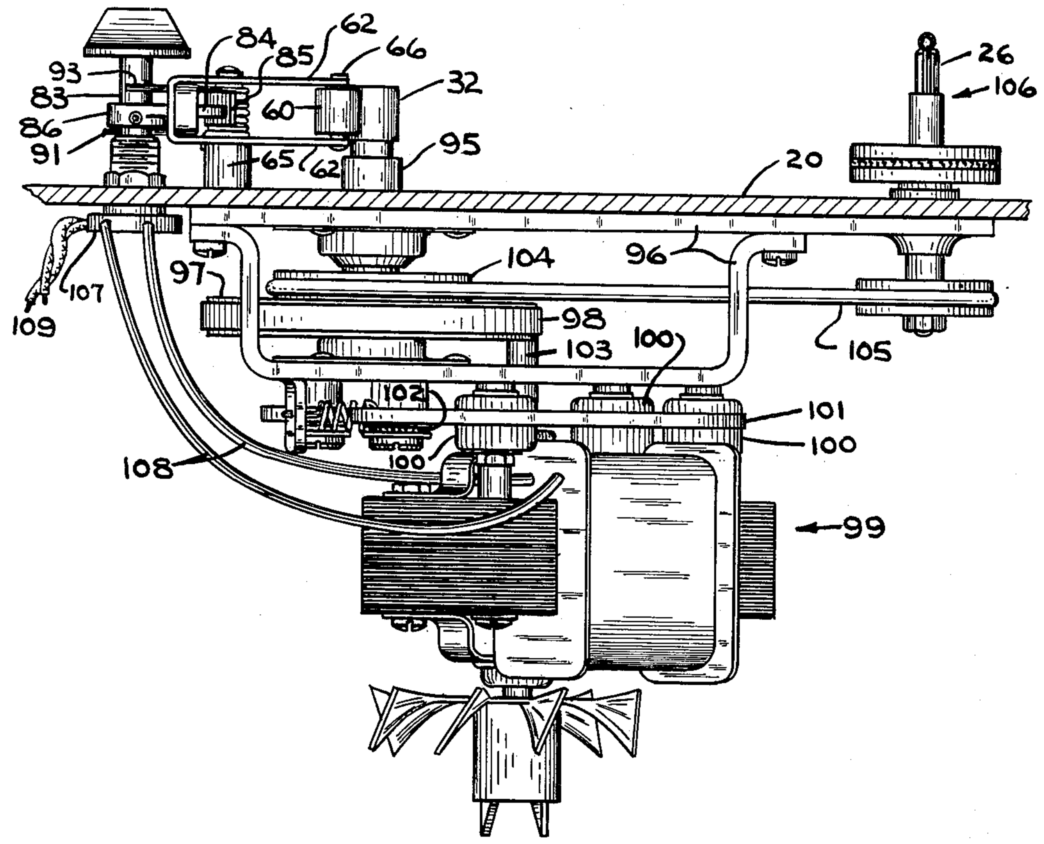
Fig. 13 is an end elevation disclosing the motor, drive and switching assemblies.

Fig. 13 discloses the motor drive for the capstan roller 32 and the takeup spindle 26. A flywheel and pulley assembly, secured to a spindle 95 on which capstan roller 32 is mounted, is carried by a hanger bracket 96 secured to cover plate 20. This assembly includes a flywheel 97 disposed concentric with spindle 95 and provided with a resilient tire 98. A motor 99 is suspended by resilient grommets 100 from a plate 101 that in turn is suspended by resilient grommets 102 from hanger bracket 96. The rotor shaft 103 of motor 99 bears against tire 98 to drive flywheel 97, spindle 95 and capstan roller 32, and a pulley 104 that is coupled by a belt 105 to rotate take up spindle 26. The motor counting is fully disclosed and claimed in United States Patent of Edmund Barany and Melvin Sackter, 2,585,724, dated February 12, 1952. The takeup assembly includes a friction slip clutch 106 through which a takeup reel, as 27 of Fig. 1, is driven, to accommodate the surface speed of an increasing coil of record body being wound on a reel so mounted and driven to the constant speed drive of the record body by the constant speed drive of capstan roller 32.

A switch 107 is mounted to the under side of cover plate 20, and is operated by shaft 83, as above set forth, to control connection of motor 99 through motor leads 108 to power supply lines 109.

It will be seen that the above-described mechanism provides for proper actuation of pressure-exerting elements, of the substantially different types of the pressure pads and pinch roll, from a common actuating member, thereby permitting all such elements to be actuated by a single movement of a single operator. This presents the advantage of assured correlation of operation of all such elements, and additionally the mechanism properly correlates such actuation with operation of the motor switch.

It will be understood that many variations from the specific arrangements disclosed in detail may be made in practicing the invention, the scope of which is to be determined solely by the claims.

We claim:

1. In a magnetic transducing instrument that includes in spaced relation along the travel path of an elongate magnetizable record body and successively in the direction of travel of such a record body during transducing operation of the instrument, a device for affecting the magnetic condition of the record body and having a guide surface, and a capstan having a periphery for driving a record body pressed against it, and said instrument including mechanism for rotating said capstan and an operation-selective member located in laterally spaced relation to said path and rotatable about an axis parallel to the axis of rotation of said capstan and between first and second predetermined angularly spaced positions wherein respectively it is effective to maintain said capstan in rotation and stopped; a mechanical system for maintaining a record body pressed against said guide surface by means of a pressure pad and against said capstan by means of a pinch roll while said member is in its first position and for maintaining said pressure pad and pinch roll spaced from said surface and periphery while the member is in its second position, said system including an actuator device laterally spaced from said path in a location between said device and capstan and pivotally mounted for swinging about a fixed axis parallel to the axis of rotation of the capstan between predetermined angularly spaced first and second positions respectively corresponding to said first and second operation-selective member positions, a bracket structure pivoted between its ends to provide a pair of lever arms and for swinging of said arms about a second fixed axis parallel to said rotation axis and located alongside said path between said actuator and capstan, a first one of said arms carrying said pinch roll in disposition to swing to and from contact with said capstan periphery by swinging of said bracket structure between first and second positions respectively corresponding to said first and second actuator and operation-selective member positions, and the second said arm extending toward said actuator member, a bias spring having one end secured in a fixed position and the other bearing against and constantly urging said bracket structure toward its said first position and pressure-exerting contact with said capstan periphery while in that position, an extension projecting from said actuator toward said second lever arm in an angular relation to clear the latter when said bracket structure and actuator member both are in their said first positions, to permit said bias spring to press said pinch roll against the capstan periphery, and to contact said second arm and swing said bracket structure to its second position during swing of said actuator member to its second position, an elongate resilient element supporting said pressure pad, extended alongside the record body path from the location of said guide surface to said actuator member and secured to the latter in angular disposition for pressing said pad against and spacing it from said surface respectively while said actuator member is in its first and second positions, and mechanism controlled by rotation of said operation-selective member for swinging the actuator member to its said first and second positions respectively as said operation-selective member is swung to its first and second positions.

2. In a magnetic transducing instrument that includes in spaced relation along the travel path of an elongate magnetizable record body and successively in the direction of travel of such a record body during transducing operation of the instrument, a device for affecting the magnetic condition of the record body and having a guide surface, and a capstan having a periphery for driving a record body pressed against it, and said instrument including mechanism for rotating said capstan and operation-selective member located in laterally spaced relation to said path and rotatable about an axis parallel to the axis of rotation of said capstan and between first and second predetermined angularly spaced positions wherein respectively it is effective to maintain said capstan in rotation and stopped; a mechanical system according to claim 10, wherein said mechanism comprises a bias spring constantly urging said actuator member toward its first position, a cam rotatable by rotation of said operation-selective member, and a cam follower projecting from said actuator member for movement by said cam and by such movement to move said actuator member to its second position as said operation-selective member is rotated from its first to its second position, and said cam and follower being arranged to have a dead center relation while said members are both in their second position, whereby movement of said actuator member and bracket structure by said bias springs from their second to their first positions is blocked while said operation-selective member is in its second position.

References Cited in the file of this patent

UNITED STATES PATENTS

| | | |
|---|---|---|
| 2,467,507 | Stone | Apr. 19, 1949 |
| 2,535,486 | Dank | Dec. 26, 1950 |
| 2,538,893 | Begun | Jan. 23, 1951 |
| 2,550,916 | Davis | May 1, 1951 |
| 2,555,643 | Harrison | June 5, 1951 |